United States Patent
Kons et al.

(10) Patent No.: US 10,276,166 B2
(45) Date of Patent: Apr. 30, 2019

(54) METHOD AND APPARATUS FOR DETECTING SPLICING ATTACKS ON A SPEAKER VERIFICATION SYSTEM

(71) Applicant: NUANCE COMMUNICATIONS, INC., Burlington, MA (US)

(72) Inventors: Zvi Kons, Haifa (IL); Ron Hoory, Haifa (IL); Hagai Aronowitz, Haifa (IL)

(73) Assignee: Nuance Communications, Inc., Burlington, MA (US)

( * ) Notice: Subject to any disclaimer, the term of this patent is extended or adjusted under 35 U.S.C. 154(b) by 204 days.

(21) Appl. No.: 14/337,411

(22) Filed: Jul. 22, 2014

(65) Prior Publication Data
US 2016/0027444 A1 Jan. 28, 2016

(51) Int. Cl.
G10L 17/00 (2013.01)
G10L 17/08 (2013.01)

(52) U.S. Cl.
CPC ............ G10L 17/005 (2013.01); G10L 17/08 (2013.01)

(58) Field of Classification Search
CPC ................................ G10L 17/08; G10L 17/14
See application file for complete search history.

(56) References Cited

U.S. PATENT DOCUMENTS

| | | | |
|---|---|---|---|
| 2005/0086705 A1* | 4/2005 | Jarman | H04H 60/13 725/136 |
| 2006/0182238 A1* | 8/2006 | Groeger | G10L 21/00 379/88.17 |
| 2006/0265211 A1* | 11/2006 | Canniff et al. | G10L 12/69 704/210 |
| 2008/0120109 A1* | 5/2008 | Ding | G10L 15/065 704/255 |

(Continued)

OTHER PUBLICATIONS

"Discrimination Method of Synthetic Speech Using Pitch Frequency against Synthetic Speech Falsification", Jan. 2005, Akio Ogihara.*

(Continued)

Primary Examiner — Lennin R Rodriguezgonzalez
(74) Attorney, Agent, or Firm — Hamilton, Brook, Smith & Reynolds, P.C.

(57) ABSTRACT

A method of detecting an occurrence of splicing in a speech signal includes comparing one or more discontinuities in the test speech signal to one or more reference speech signals corresponding to the test speech signal. The method may further include calculating a frame-based spectral-like representation $S_T$ of the speech signal, and calculating a frame-based spectral-like representation $S_E$ of a reference speech signal corresponding to the speech signal. The method further includes aligning $S_T$ and $S_E$ in time and frequency, calculating a distance function associated with aligned $S_T$ and $S_E$, and evaluating the distance function to determine a score. The method also includes comparing the score to a threshold to detect if splicing occurs in the speech signal.

23 Claims, 5 Drawing Sheets

(56) References Cited

U.S. PATENT DOCUMENTS

2008/0154595 A1* 6/2008 Nelken ............... G10L 15/1815
  704/240
2009/0165634 A1* 7/2009 Mahowald ............. G10H 1/368
  84/610

OTHER PUBLICATIONS

Detecting Digital Audio Forgeries by Checking Frame Offsets by Yang et al.*

* cited by examiner

METHOD AND APPARATUS FOR DETECTING SPLICING ATTACKS ON A SPEAKER VERIFICATION SYSTEM

BACKGROUND OF THE INVENTION

With advances in speech processing techniques, automatic user-machine interaction systems and services are becoming common across different fields. Speaker verification techniques are now employed as security measures in many computer systems. A Speaker Verification (SV) system operates to verify the identity of a user speaking a known voice pass-phrase.

A simple and well-known method for attacking such a system is a splicing method (splice attack), in which attackers collect different voice recordings from the target user. From those recordings the attackers selectively cut out the words of the pass-phrase and paste the words together (this is known as word splicing). The attackers then play this spliced sample to the SV system. This method is known to have a very high likelihood of deceiving speaker verification systems.

Currently there are no known methods for detecting splicing attacks. In order to make it more difficult for an attacker to use the splicing method, SV systems may use, for example, random pass-phrases. The accuracy of the SV for a random pass-phrase, however, is not as good as for a global or speaker-specific pass-phrase. Furthermore, even random pass-phrases may be spliced on the fly.

Another known approach for mitigating splice attacks requires a combination of a voice sample with at least one other type of biometric identification, such as face, fingerprint, or signature identification. This approach is less convenient for the users and requires additional tools and procedures to capture the additional biometrics. Furthermore, since "the chain is only as strong as its weakest link," this approach is less than ideal.

SUMMARY OF THE INVENTION

The described embodiments relate to detecting a speech sample that was generated by splicing different segments. This can be word splicing or by combining smaller speech segments such as phonemes (as may be done by concatenative Text-to-Speech systems).

FIG. 1A illustrates a typical pass phrase speaker verification system, and 1B provides a simple example of a splicing attack on the system of FIG. 1A.

A secure tool 102, such as an online banking application, may employ a speaker verification system 104 that uses a pass phrase to verify a user 106. During the initial set-up of the secure tool 102, the user speaks a pass phrase 108 (in this case, "my dog runs fast"), which is then saved in a "stored phrases" memory 110. The user 106 communicates with the tool 102 through a communications network (e.g., cellular, plain old telephone system POTS, or VoIP through the Internet).

When the user 106 wishes to use the secure tool 102, the secure tool 102 requires the user to speak the pass phrase 108. The speaker verification system 104 compares the spoken pass phrase 108 to the corresponding pass phrase stored in memory 110. If the speaker verification system 104 determines that the spoken phrase matches the stored phrase, the user is deemed authentic and allowed to use the secure tool 102.

As shown in FIG. 1B, if an attacker can monitor and record conversations in which the user 106 participates, the attacker may be able to find the words of the pass phrase being used in normal conversation. The attacker can then excise the pass phrase words from the normal conversation and splice them together in the proper order, then submit the spliced words 114 to the speaker verification system 104 as a legitimate pass phrase. The described embodiments relate to a splice detector 116 incorporated with or added to the speaker verification system 104.

To detect a splicing attack, the described embodiments may use the fact that concatenation of two speech samples usually generates a noticeable discontinuity. Those discontinuities can be detected by comparing a sample to reference samples, for example of the same textual content, which the same user may have provided during an enrollment process.

When the described embodiments indicate that a user may be trying to verify a speaker using a spliced speech sample, the embodiments can reject this sample, ask for another sample (possibly with a different password) or ask the user to use a different method for verification. The described embodiment is compare favorably to other verification systems, since in most cases a valid user will not be bothered with additional challenges. Only in small number of cases when an attack is suspected will the user be asked for additional information.

In one aspect, described embodiments of the invention include a method of detecting an occurrence of splicing in a test speech signal. The method may include comparing one or more discontinuities in the test speech signal to one or more reference speech signals corresponding to the test speech signal. In one embodiment, the method further includes calculating a frame-based spectral-like representation $S_T$ of the speech signal and calculating a frame-based spectral-like representation $S_E$ of a reference speech signal corresponding to the speech signal. The method may further include aligning ST and SE in time and frequency, calculating a distance function associated with aligned ST and SE and evaluating the distance function to determine a score. The method may also include comparing the score to a threshold to detect if splicing occurs in the speech signal.

In one embodiment, the reference speech signal represents to a predetermined phrase spoken by a presumed speaker of the speech signal. The speech signal and the corresponding reference speech signal may be speech segments. The frame-based spectral-like representations may be short time Fourier transforms or they may be Mel-frequency cepstral coefficients.

In one embodiment, performing time alignment between $S_T$ and $S_E$ includes performing dynamic time warping. In another embodiment, performing spectral alignment between $S_T$ and $S_E$ includes calculating a global linear transformation of $S_E$ so as to minimize a difference between ST and the global linear transformation of $S_E$.

In an embodiment, calculating the distance function further includes constructing one or more models that simulates a difference $S_T$–$S_E$. Calculating the distance function further includes selecting a prime model that is one of the models that predict an actual difference $S_T$–$S_E$ better than others of the one or more models, using the prime model to extrapolate a predicted difference $S_{Tp}$–$S_{Ep}$, and calculating a difference between the difference $S_T$–$S_E$ and the predicted difference $S_{Tp}$–$S_{Ep}$. In another embodiment, the one or more models includes at least one of a $0^{th}$ order model, a first order model and a second order model.

An embodiment may include evaluating the distance function to determine a score includes at least one of (i) assigning an nth highest value of the distance function as the score, (ii) assigning an average of m values of the distance function as the score and (iii) assigning a median of p values of the distance function as the score, where n, m and p are integers.

In another aspect, described embodiments may include an apparatus for detecting an occurrence of splicing in a speech signal. The apparatus may include a processor and a memory. The memory may be configured to store instructions to be executed by the processor. The processor may be configured to execute the instructions to cause the apparatus to compare one or more discontinuities in the test speech signal to one or more reference speech signals corresponding to the test speech signal.

In other embodiments, the processor may be further configured to execute the instructions to cause the apparatus to perform one or more of the steps described herein.

In another aspect, described embodiments may include a non-transitory computer-readable medium with computer code instruction stored thereon, the computer code instructions when executed by an a processor cause an apparatus to compare one or more discontinuities in the test speech signal to one or more reference speech signals corresponding to the test speech signal.

In other embodiments, the computer code instructions when executed by an a processor cause an apparatus to cause the apparatus to perform one or more of the steps described herein.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1A:
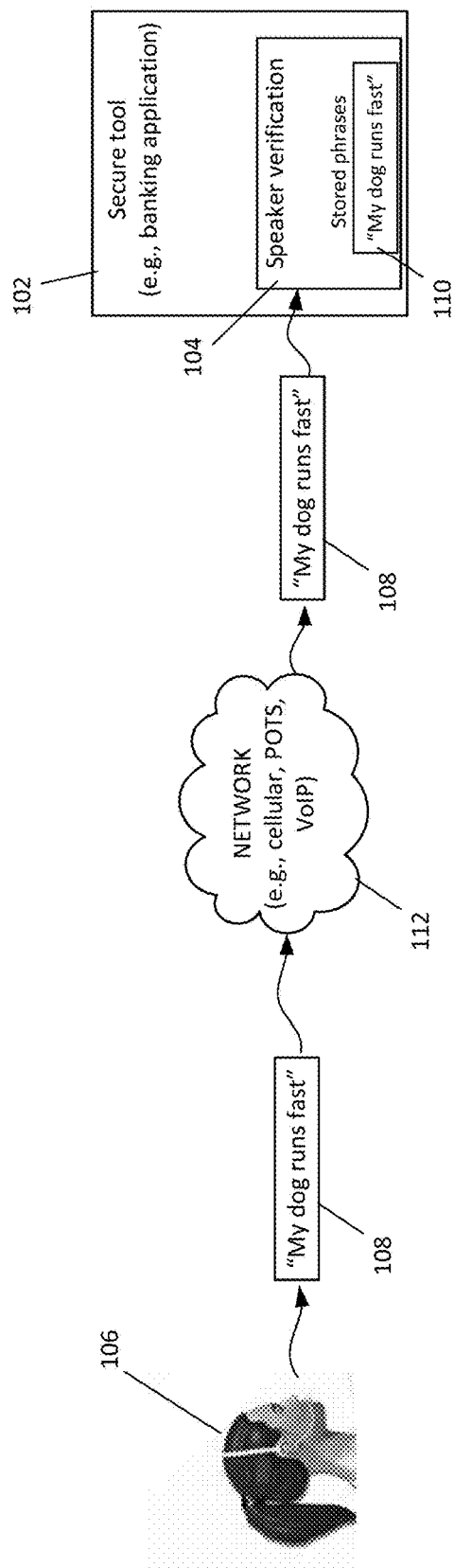
FIG. 1A illustrates a pass phrase speaker verification system according to the described embodiments.

A description of example embodiments of the invention follows.

The described embodiments evaluate a candidate test speech signal T, which is intended to be a pass phrase spoken by a given user, to determine if the speech signal T is part of a splicing attack. The described embodiments may return a score representing the likelihood that the signal T is not natural, continuous speech (i.e., the likelihood that the signal was created by splicing of different speech segments).

The described embodiments utilize enrollment samples $E_1, \ldots E_N$ that contain the same pass phrase recorded previously by the same user.

The described embodiments utilize the fact that the splicing procedure may cause some noticeable discontinuities in the speech signal T. It is known, however, that even natural speech contains different discontinuities caused by normal speech production such as in the /t/ and /b/ consonants. The described embodiments utilize a comparison of the discontinuities in the test signal to the natural discontinuities in the enrollment signals, to distinguish between naturally-occurring discontinuities and discontinuities due to splicing.

For each one of the speech samples T and enrollment samples $E_1, \ldots E_N$ the described embodiments calculate a frame based spectral-like representations $S_T$ and $S_{En}$) respectively. This spectral representation can be for example short time Fourier transform (FFT) or Mel-frequency cepstral coefficients (MFCC). In this notation $S_T(i,t)$ is the $i^{th}$ spectral coefficient from frame number t of signal T.

A procedure for detecting a splicing attack according to the described embodiments may consist of the following three stages:

1. Time and spectral alignment
2. Distance calculation using local transformations
3. Scoring Time and Spectral Alignment For each enrollment signal $S_E$, the described embodiment applies the following procedure:

A) Time alignment between the frames of $S_T$ and $S_E$ using Dynamic Time Warping (DTW). This procedure results with two aligned spectra such that:

$$S_T^1(i,t) \approx S_E^1(i,t) \tag{1}$$

B) Perform Spectral alignment using the two aligned spectra in equation (1) to calculate a global linear transformation defined as:

$$T(S(i,t)) = \Sigma A_{ij} S(j,t) + b_i \tag{2}$$

while determining parameters A and b that minimizes the difference between the aligned spectra $S_T^1$ and $S_E^1$ $$A, b = \mathrm{argmin}\left[\sum_{i,t}(S_T^1(i,t) - T(S_E^1(i,t)))^2\right] \tag{3}$$

C) Improve the time alignment by applying DTW again, this time between $S_T$ and the frequency aligned enrollment spectrum $T(S_E)$. This results in the aligned signal $S_T^2$ and $S_E^2$ with $$S_T^2(i,t) \approx T(S_E^2(i,t)) \tag{4}$$

Distance Calculation Using Local Transformations

For each pair of time and frequency aligned signals $S_T$ and $S_E$ (those are respectively $S_T^2$ and $T(S_E^2)$ from eq. (4)), we calculate a function d(t), referred to herein as the distance function. This function represents the discontinuity of the test signal at each frame t.

One embodiment calculates the distance function d(t) for each frame t using the procedure set forth below. An example distance function calculation is depicted graphically in FIG. 2.

Figure 1B:
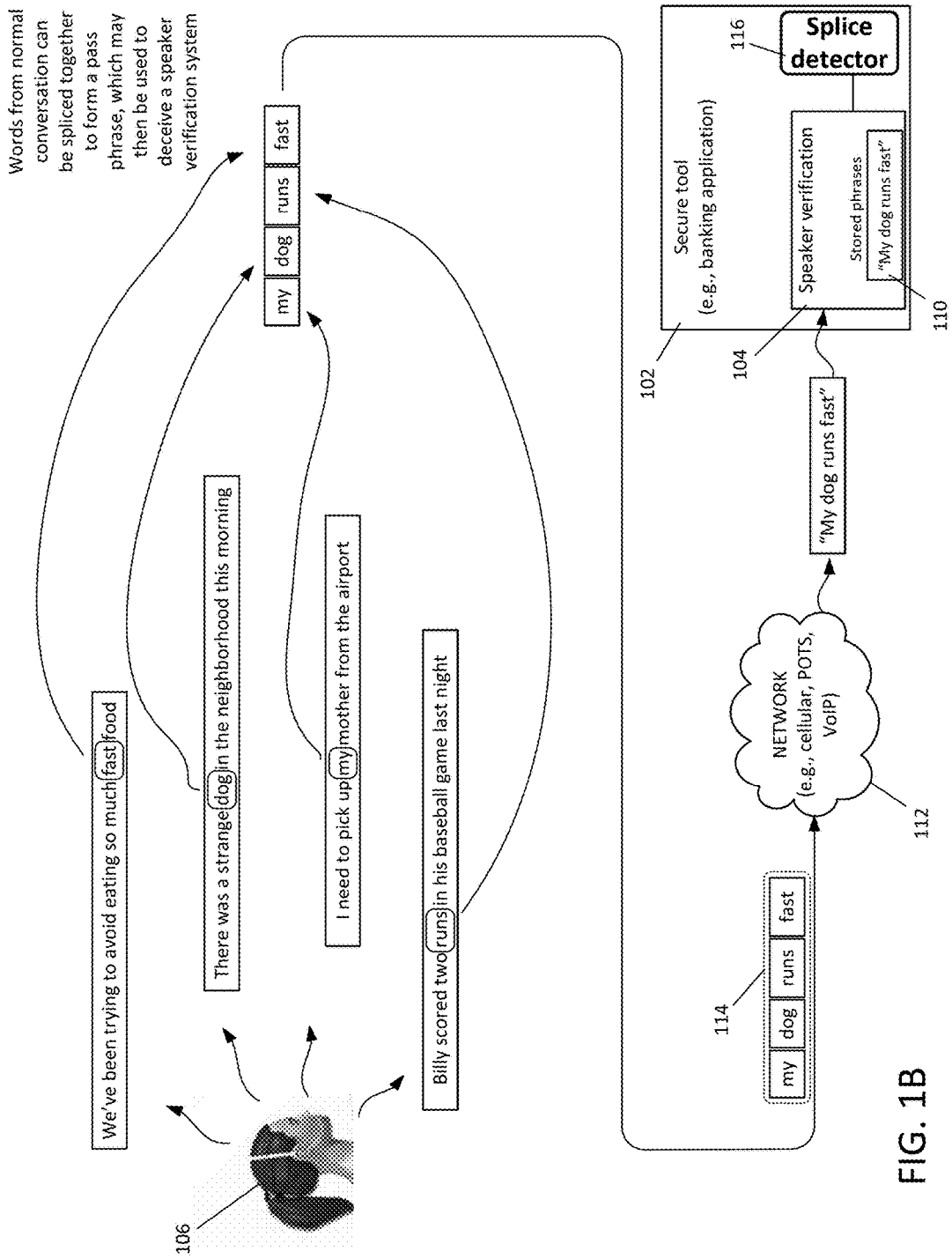
FIG. 1B provides a simple example of a splicing attack on the system of FIG. 1A.
Figure 2:
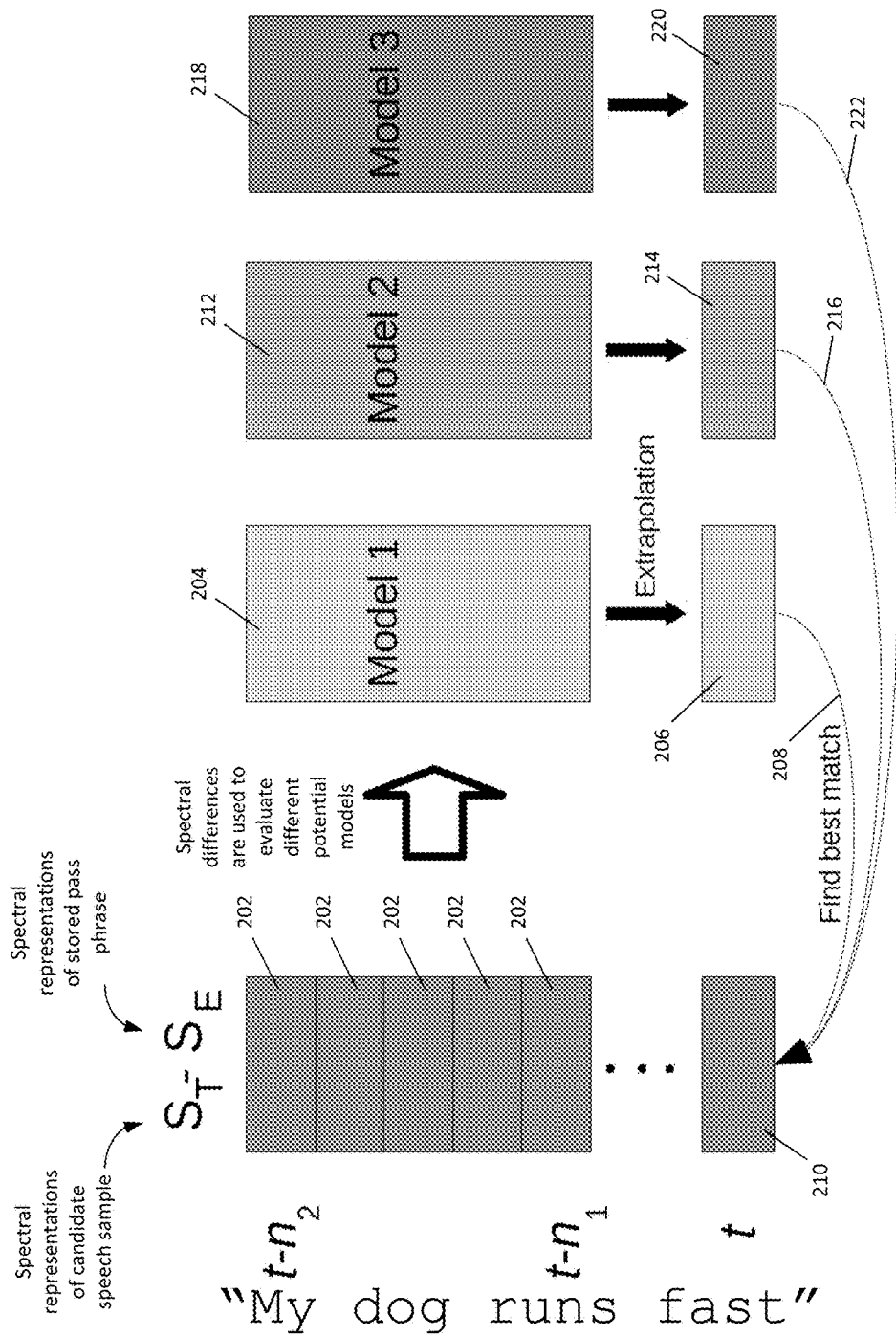
FIG. 2 illustrates an example distance function calculation according to the described embodiments.

1. Calculate the difference between the enrollment (i.e., stored) signal spectrum and the test (i.e., candidate) signal spectrum, for several frames before t. FIG. 2 shows a number of difference calculations 202 that were calculated for frames over a period ($t-n_2$) to ($t-n_1$).
2. Find a model that can represent these differences as a function of time. FIG. 2 illustrates a first model 204.
3. Use this model to extrapolate the difference of the spectrum for frame t. FIG. 1 shows an extrapolated difference 206 based on the first model 204.

4. Compare this extrapolation to the real difference at frame t. FIG. 2 shows a comparison 208 made between the extrapolated difference 206 and the real calculated difference 210.
5. Using a different model, repeat elements 1 through 4 above. Find a primary model that produces the best (i.e., most accurate) extrapolation with respect to the real spectrum difference. FIG. 2 shows a second model 212 with a corresponding extrapolated difference 214 and a comparison 216 of the extrapolated difference 214 with the real calculated difference 210, along with a third model 218, a corresponding extrapolated difference 220 and a comparison 1222 of the extrapolated difference 220 with the real calculated difference 210.
6. Identify the difference function, evaluated at frame t, as a measure of the accuracy of the primary model's performance at frame t.

If this evaluation is performed on a test signal that consists of a continuous range of speech frames, the spectral difference calculated across those frames should be a smooth function. In such a case it is likely that the extrapolation will result in an accurate prediction of the difference at frame t. On the other hand, if a discontinuity exists in the test signal, it is likely that the extrapolated difference prediction will not accurately match the real difference.

This procedure can be expressed as follows: define the difference in spectrum as $$\Delta S(i,t) = S_T(i,t) - S_E(i,t) \qquad (5)$$

For each frame t, three different models $M_k$ are calculated with a parameter set $\theta_k(t)$ such that:

$$\theta_k(t) = \operatorname*{argmin}_{\theta} \left[ \sum_i \sum_{\tau=t-n_1}^{t-n_2} (M_k(i, \tau, \theta) - \Delta S(i, \tau))^2 \right] \qquad (6)$$

The details of the models $M_k$ are described below (see, e.g., eq. (8), (10) and (12)). The distance function d(t) is defined as the frame distance for the best transform:

$$d(t) = \min_k \sum_i |M_k(i, t, \theta_k(t)) - \Delta S(i, t)| \qquad (7)$$

The model $M_k$ in equation (7) may include any of a variety of models, linear and non-linear. For the example embodiments described herein, three such models are described: a $0^{th}$ order model, a first order model and a second order model.

$0^{th}$ Order Model

This model is simply a constant with respect to time:

$$M_0(i,t) = a_i \qquad (8)$$

The constants $a_i$ may be determined, for example, by averaging over a time interval:

$$a_i = \frac{1}{(n_2 - n_1)} \sum_{\tau=t-n_2}^{t-n_1} \Delta S(i, \tau) \qquad (9)$$

First Order Model

This model uses a linear fitting $$M_1(i,t,a,b) = a_i + b_i t \qquad (10)$$

The coefficients of equation (10) may be found, for example, using linear regression:

$$a_i, b_i = \operatorname*{argmin} \sum_{\tau=t-n_2}^{t-n_1} [M_1(i, \tau, a, b) - \Delta S(i, \tau)]^2 \qquad (11)$$

Second Order Model

The second order model uses regression to calculate a second order polynomial from the difference of spectrum over a small range of frequency bins:

$$M_{2,i}(j,t) = a_i + b_i t + c_i j + d_i t^2 + e_i j t + f_i j^2 \qquad (12)$$

The coefficients of equation (12) may be found as follows:

$$a_i, b_i, \ldots f_i = \operatorname*{argmin} \sum_{j=i-2}^{i+2} \sum_{\tau=t-n_2}^{t-n_1} (\Delta S(j, \tau) - M_{2,i}(j, \tau))^2 \qquad (13)$$

All the polynomials that overlap a frequency bin are averaged for the final transformation $$M_2(i, t) = \frac{1}{5} \sum_{j=i-2}^{i+2} M_{2,j}(i, t) \qquad (14)$$

Scoring

The distance function d(t) (as set forth for example in eq. (7)) that was calculated for the speech sample $S_T$ and one or more enrollment signals $S_E$ is used for scoring the test sample. The resulting score quantifies the likelihood that the test sample is not a natural speech artifact.

Several scoring options may be used. For example:

Use the $n^{th}$ highest value of d(t) as the score (e.g., the $7^{th}$ highest value).

Use an average or median of several values (e.g. average of the $4^{th}$ to $8^{th}$ highest values).

The described embodiments may use any one of these or similar scoring options, or a combination of two or more such scoring options may be used.

Instead of looking at the frames over an entire speech sample, some embodiments may narrow the search to those frames where splicing is likely to happen, or is more likely to be detected. This could be, for example, at the boundaries between words, or only on frames that contain voiced speech (e.g., vowels rather than consonants). This scheme of boundary evaluation may be combined with any of the scoring options set forth above. For example, an embodiment may take the score as the average of d(t) over frames that are near the word boundaries.

The selection of specific scoring method may be based on the pass-phrase and on the expected attacks. For example, suppose a pass phrase includes 10 possible splicing points and detection of about half of them is reasonably expected, an embodiment may use the fifth highest value of d(t) as the score.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein Further, certain embodiments of the invention may be implemented as logic that performs one or more functions. This logic may be hardware-based, software-based, or a combination of hardware-based and software-based. Some or all of the logic may be stored on one or more tangible computer-readable storage media and may include computer-executable instructions that may be executed by a controller or processor. The computer-executable instructions may include instructions that implement one or more embodiments of the invention. The tangible computer-readable storage media may be volatile or non-volatile and may include, for example, flash memories, dynamic memories, removable disks, and non-removable disks.

Figure 3:
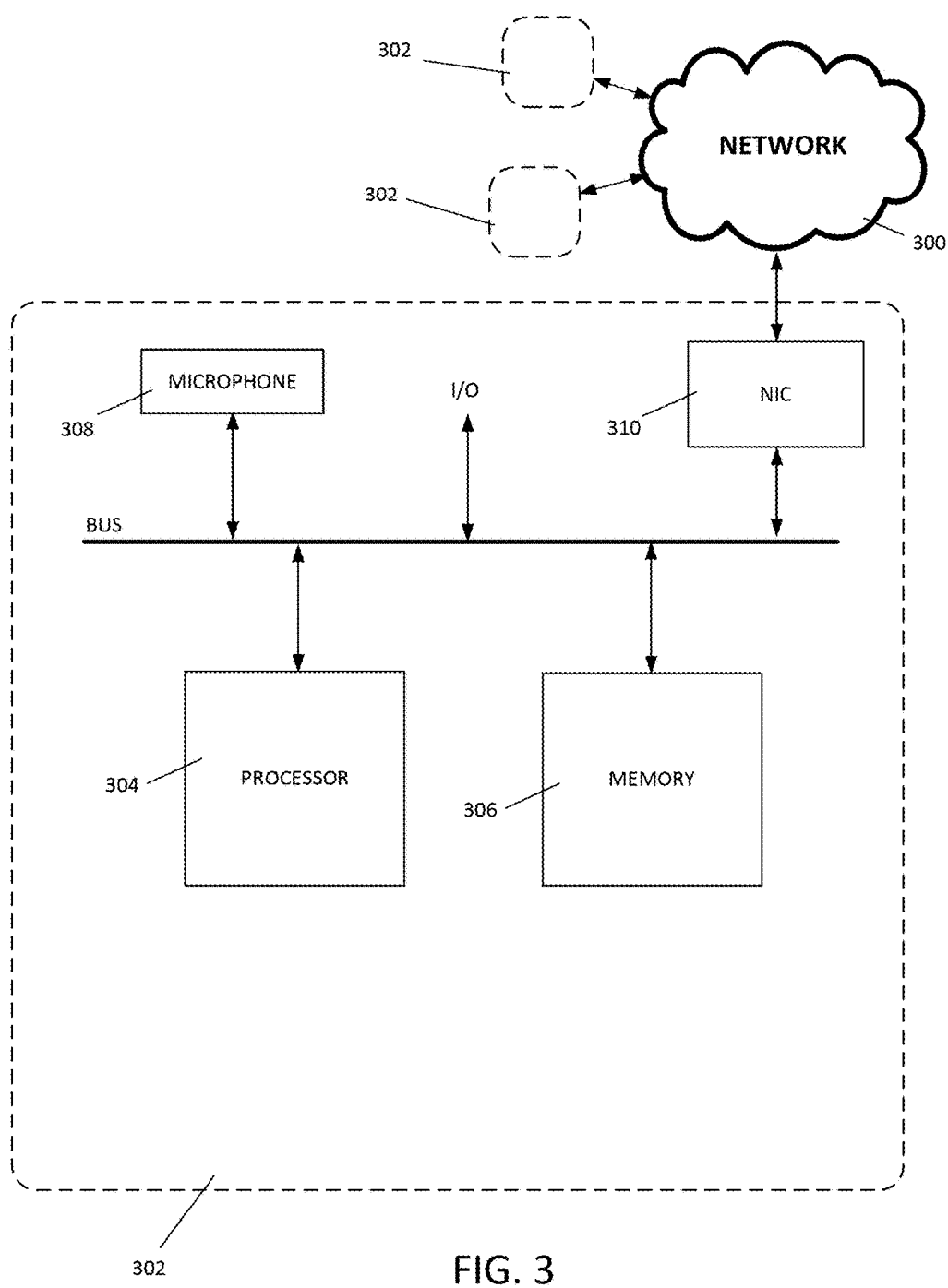
FIG. 3 illustrates an example computer and network according to the described embodiments.

Illustrated in FIG. 3 is an example computer 302 and computer network 300 that may be used in association with the described embodiments. The computer 302 may include any of a variety of processing platforms known in the art. For example, the computer 302 may include a desktop, laptop or notebook computer, on a smartphone, or on a tablet or other such handheld processing device.

Each computer 302 may have a processor 304 (e.g., CPU), a memory 306, a microphone 208 and a network interface circuit (NIC) 210, among other components such as user I/O, power distribution and data interconnection. The NIC 310 provides interface communication services (e.g., hardware and protocol stack) to allow the node 302 to communicate with other nodes and devices through the network 300. The processor 304 and memory 306 carry out instructions implementing the described embodiments. The microphone 308 may provide a speech sample as described herein. Alternatively, the speech sample may be provided from another source such as from a remote source through the network 300. The enrollment samples described herein may be stored locally in the memory 306, or they may be provided through another source such as through the network 300.

Figure 4:
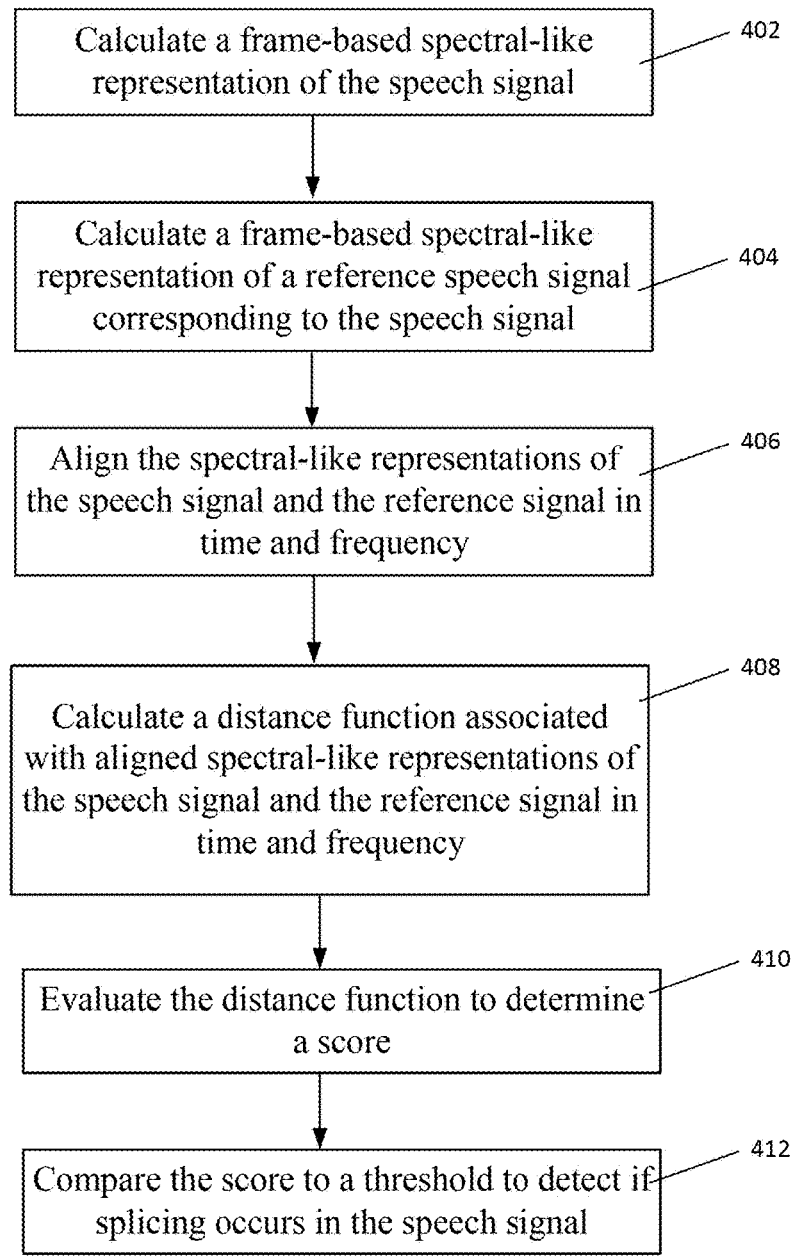
FIG. 4 illustrates a computer method and/or software assembly that implements a procedure for detecting an occurrence of splicing in a speech signal according to the described embodiments.

FIG. 4 illustrates a computer method and/or software assembly 400 that implements a procedure for detecting an occurrence of splicing in a speech signal according to the described embodiments. The procedure (generally method/assembly 400) calculates 402 frame-based spectral-like representation $S_T$ of the speech signal. The procedure further calculates 404 a frame-based spectral-like representation $S_E$ of a reference speech signal corresponding to the speech signal. The procedure aligns 406 $S_T$ and $S_E$ in time and frequency, calculates a distance function associated with aligned $S_T$ and $S_E$, and evaluates the distance function to determine a score. The procedure compares the score to a threshold to detect if splicing occurs in the speech signal. The software assembly 400 depicted in FIG. 4 may be stored in the memory 306 and/or executed by the processor 304 of FIG. 3.

While this invention has been particularly shown and described with references to example embodiments thereof, it will be understood by those skilled in the art that various changes in form and details may be made therein without departing from the scope of the invention encompassed by the appended claims.

What is claimed is:

1. A method of detecting an occurrence of splicing in a test speech signal, comprising:
    comparing one or more signal discontinuities in the test speech signal to one or more reference speech signals corresponding to the test speech signal; and
    distinguishing, based on the comparing, between a naturally-occurring signal discontinuity and a splicing-based signal discontinuity.

2. The method of claim 1, further comprising:
    calculating a frame-based spectral-like representation $S_T$ of the speech signal;
    calculating a frame-based spectral-like representation $S_E$ of a reference speech signal corresponding to the speech signal;
    aligning $S_T$ and $S_E$ in time and frequency;
    calculating a distance function associated with aligned $S_T$ and $S_E$;
    evaluating the distance function to determine a score; and
    comparing the score to a threshold to detect if splicing occurs in the speech signal.

3. The method of claim 2, wherein the frame-based spectral-like representations are short time Fourier transforms.

4. The method of claim 2, wherein the frame-based spectra-like representations are Mel-frequency cepstral coefficients.

5. The method of claim 2, wherein performing a time alignment between $S_T$ and $S_E$ includes performing a dynamic time warping.

6. The method of claim 2, wherein performing a spectral alignment between $S_T$ and $S_E$ includes calculating a global linear transformation of $S_E$ so as to minimize a difference between $S_T$ and the global linear transformation of $S_E$.

7. The method of claim 2, wherein calculating the distance function further comprises:
    (i) constructing one or more models that simulates a difference $S_T$–$S_E$;
    (ii) selecting a prime model being one of the one or more models that predicts an actual difference $S_T$–$S_E$ better than others of the one or more models;
    (iii) using the prime model to extrapolate a predicted difference $S_{Tp}$–$S_{Ep}$;
    (iv) calculating a difference between the difference $S_T$–$S_E$ and the predicted difference $S_{Tp}$–$S_{Ep}$.

8. The method of claim 7, wherein the one or more models includes at least one of a $0^{th}$ order model, a first order model and a second order model.

9. The method of claim 7, wherein evaluating the distance function to determine a score includes at least one of (i) assigning an $n^{th}$ highest value of the distance function as the score, (ii) assigning an average of m values of the distance function as the score and (iii) assigning a median of p values of the distance function as the score, where n, m and p are integers.

10. The method of claim 1, wherein the reference speech signal represents to a predetermined phrase spoken by a presumed speaker of the speech signal.

11. The method of claim 1, wherein the test speech signal and the corresponding reference speech signal are speech segments.

12. An apparatus for detecting an occurrence of splicing in a speech signal, comprising:
    a processor; and
    a memory configured to store instructions to be executed by the processor;
    the processor being configured to execute the instructions thereby causing the apparatus to: (i) compare one or more signal discontinuities in the test speech signal to one or more reference speech signals corresponding to the test speech signal, and (ii) distinguish, based on the compare, between a naturally-occurring signal discontinuity and a splicing-based signal discontinuity.

13. The apparatus of claim 12, the processor being further configured to execute the instructions thereby causing the apparatus to:
    calculate a frame-based spectral-like representation $S_T$ of the speech signal;
    calculate a frame-based spectral-like representation $S_E$ of a reference speech signal corresponding to the speech signal;
    align $S_T$ and $S_E$ in time and frequency;
    calculate a distance function associated with aligned $S_T$ and $S_E$;
    evaluate the distance function to determine a score; and
    compare the score to a threshold to detect if splicing occurs in the speech signal.

14. The apparatus of claim 13, wherein the frame-based spectral-like representations are short time Fourier transforms.

15. The apparatus of claim 13, wherein the frame-based spectra-like representations are Mel-frequency cepstral coefficients.

16. The apparatus of claim 13, wherein performing a time alignment between $S_T$ and $S_E$ includes performing a dynamic time warping.

17. The apparatus of claim 13, wherein performing a spectral alignment between $S_T$ and $S_E$ includes calculating a global linear transformation of $S_E$ so as to minimize a difference between $S_T$ and the global linear transformation of $S_E$.

18. The apparatus of claim 13, wherein calculating the distance function further comprises:
    (i) constructing one or more models that simulates a difference $S_T-S_E$;
    (ii) selecting a prime model being one of the one or more models that predicts an actual difference $S_T-S_E$ better than others of the one or more models;
    (iii) using the prime model to extrapolate a predicted difference $S_{Tp}-S_{Ep}$;
    (iv) calculating a difference between the difference $S_T-S_E$ and the predicted difference $S_{Tp}-S_{Ep}$.

19. The apparatus of claim 18, wherein the one or more models includes at least one of a 0th order model, a first order model and a second order model.

20. The apparatus of claim 12, wherein the reference speech signal represents to a predetermined phrase spoken by a presumed speaker of the speech signal.

21. The apparatus of claim 12, wherein the test speech signal and the corresponding reference speech signal are speech segments.

22. A non-transitory computer-readable medium with computer code instruction stored thereon, the computer code instructions when executed by an a processor cause an apparatus to: (i) compare one or more signal discontinuities in the test speech signal to one or more reference speech signals corresponding to the test speech signal, and (ii) distinguish, based on the compare, between a naturally-occurring signal discontinuity and a splicing-based signal discontinuity.

23. The non-transitory computer-readable medium of claim 22, the computer code instructions when executed by an a processor further cause an apparatus to:
    calculate a frame-based spectral-like representation ST of the speech signal;
    calculate a frame-based spectral-like representation SE of a reference speech signal corresponding to the speech signal;
    align ST and SE in time and frequency;
    calculate a distance function associated with aligned ST and SE;
    evaluate the distance function to determine a score; and
    compare the score to a threshold to detect if splicing occurs in the speech signal.

* * * * *